United States Patent
Katz

(10) Patent No.: US 9,208,209 B1
(45) Date of Patent: Dec. 8, 2015

(54) TECHNIQUES FOR MONITORING TRANSFORMATION TECHNIQUES USING CONTROL CHARTS

(71) Applicant: SAS Institute, Inc., Cary, NC (US)

(72) Inventor: Joseph H. Katz, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 14/668,854

(22) Filed: Mar. 25, 2015

Related U.S. Application Data

(60) Provisional application No. 62/058,848, filed on Oct. 2, 2014.

(51) Int. Cl.
*G06F 9/44* (2006.01)
*G06F 17/30* (2006.01)

(52) U.S. Cl.
CPC .... *G06F 17/30563* (2013.01); *G06F 17/30598* (2013.01)

(58) Field of Classification Search
CPC .................... G06F 17/30563; G06F 17/30598; G06F 9/44
See application file for complete search history.

(56) References Cited

U.S. PATENT DOCUMENTS

| | | | |
|---|---|---|---|
| 5,461,699 A | 10/1995 | Arbabi et al. | |
| 5,615,109 A | 3/1997 | Eder | |
| 5,870,746 A | 2/1999 | Knutson et al. | |
| 5,918,232 A | 6/1999 | Pouschine et al. | |
| 5,953,707 A | 9/1999 | Huang et al. | |
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,584 A | 11/2000 | Papierniak et al. | |
| 6,169,534 B1 | 1/2001 | Raffel et al. | |

(Continued)

FOREIGN PATENT DOCUMENTS

| | | |
|---|---|---|
| EP | 2624171 A2 | 8/2013 |
| WO | 0217125 A1 | 2/2002 |
| WO | 2005/124718 A2 | 12/2005 |

OTHER PUBLICATIONS

DataNet Quality Systems, What are the Western Electric Rules, http://www.winspc.com/14-datanet-quality-systems/support-a-resources/179-what-are-the-western-electric-rules, (available online Apr. 14, 2014).*

(Continued)

*Primary Examiner* — Toan Le
(74) *Attorney, Agent, or Firm* — Kilpatrick Townsend & Stockton LLP

(57) ABSTRACT

Techniques for applying transformation techniques and using transformation outputs to implement remedial actions are included. A system may include a receiver that may receive time series data including data points and one or more specifications for a transformation technique applicable to the time series data. The system may include a transformation engine that may apply the transformation technique to the time series data to produce outputs. The system may include a control engine that may determine a set of control limits using, for example, a control chart and a set of residual values. The system may include an anomaly detection engine that may generate the set of residual values using the current data points and the outputs. The anomaly detection engine may further identify one or more anomalies of the set of residual values based on the set of control limits and the control chart.

30 Claims, 12 Drawing Sheets

(56) References Cited

U.S. PATENT DOCUMENTS

| | | |
|---|---|---|
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,591,255 B1 | 7/2003 | Tatum et al. |
| 6,609,085 B1 | 8/2003 | Uemura et al. |
| 6,611,726 B1 | 8/2003 | Crosswhite |
| 6,640,227 B1 | 10/2003 | Andreev |
| 6,735,738 B1 | 5/2004 | Kojima |
| 6,748,374 B1 | 6/2004 | Madan et al. |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,152,068 B2 | 12/2006 | Emery et al. |
| 7,171,340 B2 | 1/2007 | Brocklebank |
| 7,194,434 B2 | 3/2007 | Piccioli |
| 7,216,088 B2 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,809 B1 | 10/2008 | Guirguis |
| 7,433,834 B2 | 10/2008 | Joao |
| 7,454,420 B2 | 11/2008 | Ray et al. |
| 7,523,048 B1 | 4/2009 | Dvorak |
| 7,530,025 B2 | 5/2009 | Ramarajan et al. |
| 7,565,417 B2 | 7/2009 | Rowady, Jr. |
| 7,570,262 B2 | 8/2009 | Landau et al. |
| 7,610,214 B1 * | 10/2009 | Dwarakanath et al. ...... 705/7.31 |
| 7,617,167 B2 | 11/2009 | Griffis et al. |
| 7,624,114 B2 | 11/2009 | Paulus et al. |
| 7,660,734 B1 | 2/2010 | Neal et al. |
| 7,660,823 B2 | 2/2010 | Clover |
| 7,664,618 B2 | 2/2010 | Cheung et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard et al. |
| 7,716,022 B1 | 5/2010 | Park et al. |
| 7,774,179 B2 | 8/2010 | Guirguis |
| 7,941,413 B2 | 5/2011 | Kashiyama et al. |
| 7,966,322 B2 | 6/2011 | Clover |
| 8,005,707 B1 | 8/2011 | Jackson et al. |
| 8,010,324 B1 | 8/2011 | Crowe et al. |
| 8,010,404 B1 | 8/2011 | Wu et al. |
| 8,014,983 B2 | 9/2011 | Crowe et al. |
| 8,015,133 B1 * | 9/2011 | Wu et al. ........................ 706/21 |
| 8,087,001 B2 | 12/2011 | Hoyek et al. |
| 8,112,302 B1 | 2/2012 | Trovero et al. |
| 8,321,479 B2 | 11/2012 | Bley |
| 8,326,677 B1 | 12/2012 | Fan et al. |
| 8,364,517 B2 | 1/2013 | Trovero et al. |
| 8,374,903 B2 | 2/2013 | Little |
| 8,489,622 B2 | 7/2013 | Joshi et al. |
| 8,515,835 B2 | 8/2013 | Wu et al. |
| 8,631,040 B2 | 1/2014 | Jackson et al. |
| 8,645,421 B2 | 2/2014 | Meric et al. |
| 8,676,629 B2 | 3/2014 | Chien et al. |
| 8,768,866 B2 | 7/2014 | Desai |
| 2002/0169657 A1 | 11/2002 | Singh et al. |
| 2002/0169658 A1 | 11/2002 | Adler |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0030667 A1 | 2/2004 | Xu et al. |
| 2004/0041727 A1 | 3/2004 | Ishii et al. |
| 2004/0172225 A1 | 9/2004 | Hochberg et al. |
| 2004/0230470 A1 | 11/2004 | Svilar et al. |
| 2005/0055275 A1 | 3/2005 | Newman et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247900 A1 | 11/2006 | Brocklebank |
| 2007/0011175 A1 | 1/2007 | Langseth et al. |
| 2007/0055604 A1 | 3/2007 | Their et al. |
| 2007/0094168 A1 | 4/2007 | Ayala et al. |
| 2007/0106550 A1 | 5/2007 | Umblijs et al. |
| 2007/0118491 A1 | 5/2007 | Baum et al. |
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0208608 A1 | 9/2007 | Amerasinghe et al. |
| 2007/0291958 A1 | 12/2007 | Jehan |
| 2008/0040202 A1 | 2/2008 | Walser et al. |
| 2008/0208832 A1 | 8/2008 | Friedlander et al. |
| 2008/0288537 A1 | 11/2008 | Golovchinsky et al. |
| 2008/0294651 A1 | 11/2008 | Masuyama et al. |
| 2009/0018996 A1 | 1/2009 | Hunt et al. |
| 2009/0099988 A1 * | 4/2009 | Stokes et al. ................... 706/20 |
| 2009/0172035 A1 | 7/2009 | Lessing et al. |
| 2009/0216611 A1 | 8/2009 | Leonard et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0106561 A1 | 4/2010 | Peredriy et al. |
| 2010/0114899 A1 | 5/2010 | Guha et al. |
| 2010/0121868 A1 | 5/2010 | Biannic et al. |
| 2010/0257133 A1 | 10/2010 | Crowe et al. |
| 2011/0106723 A1 | 5/2011 | Chipley et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1 | 3/2012 | Richard |
| 2012/0123994 A1 * | 5/2012 | Lowry .................. G06Q 40/00 706/52 |
| 2012/0310939 A1 | 12/2012 | Lee et al. |
| 2013/0024167 A1 | 1/2013 | Blair et al. |
| 2013/0024173 A1 | 1/2013 | Brzezicki et al. |
| 2013/0238399 A1 | 9/2013 | Chipley et al. |
| 2013/0268318 A1 | 10/2013 | Richard |
| 2014/0019088 A1 | 1/2014 | Leonard et al. |
| 2014/0019448 A1 | 1/2014 | Leonard et al. |

(56) References Cited

U.S. PATENT DOCUMENTS

2014/0019909 A1  1/2014  Leonard et al.
2014/0257778 A1  9/2014  Leonard et al.
2015/0052173 A1  2/2015  Leonard et al.

OTHER PUBLICATIONS

Davis Aquilano Chase, Fundamentals of Operations Management, Chapter 9 Forecasting, The McGraw-Hill Companies, Inc. 2003, 42 pages.*

Cecil Bozarth, Ph.D., Measuring Forecast Accuracy: Approaches to Forecasting: A Tutorial, Published Jan. 25, 2011, 3 Pages.*

Aiolfi, Marco et al., "Forecast Combinations," Creates Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (1 pg.), Mar. 2002.

Funnel Web, Web site Analysis Report, Funnel Web Demonstration, Clients History, http://www/quest.com/funnel.sub.--web/analyzer/sample.ClientHist- .html (2 pp.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Oates, Tim et al., "Clustering Time Series with Hidden Markov Models and Dynamic Time Warping", Computer Science Department, LGRC University of Massachusetts, In Proceedings of the IJCAI-99, 5 pp. (1999).

Park, Kwan Hee, Abstract "Development and evaluation of a prototype expert system for forecasting models", Mississippi State University, 1990, 1 pg.

Product Brochure, Forecast PRO, 2000, 12 pp.

Quest Software, "Funnel Web Analyzer: Analyzing the Way Visitors Interact with Your Web Site", http://www.quest.com/funnel.sub.--web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAS/ETS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/in tro-/dumseas.htm.

Simoncelli, Eero, "Least Squares Optimization," Center for Neural Science, and Courant Institute of Mathematical Sciences, pp. 1-8 (Mar. 9, 2005).

Tashman, Leonard J. et al., Abstract "Automatic Forecasting Software: A Survey and Evaluation", International Journal of Forecasting, vol. 7, Issue 2, Aug. 1991, 1 pg.

Using Predictor Variables, (1999) SAS OnlineDoc: Version 8, pp. 1325-1349, Accessed from: http://www.okstate.edu/sas/v8/saspdf/ets/chap27.pdf.

van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).

Vanderplaats, Garret N., "Numerical Optimization Techniques for Engineering Design", Vanderplaats Research & Development (publisher), Third Edition, 18 pp. (1999).

Wang, Liang et al., "An Expert System for Forecasting Model Selection", IEEE, pp. 704-709 (1992).

Atuk, Oguz et al., "Seasonal Adjustment in Economic Time Series," Statistics Department, Discussion Paper No. 2002/1, Central Bank of the Republic of Turkey, Central Bank Review, 15 pp. (2002).

Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.

Bruno, Giancarlo et al., "The Choice of Time Intervals in Seasonal Adjustment: A Heuristic Approach," Institute for Studies and Economic Analysis, Rome Italy, 14 pp. (2004).

Bruno, Giancarlo et al., "The Choice of Time Intervals in Seasonal Adjustment: Characterization and Tools," Institute for Studies and Economic Analysis, Rome, Italy, 21 pp. (Jul. 2001).

Bradley, D.C. et al., "Quantitation of measurement error with Optimal Segments: basis for adaptive time course smoothing," Am J Physiol Endocrinol Metab Jun. 1, 1993 264:(6) E902-E911.

Huang, N. E. et al.,"Applications of Hilbert-Huang transform to non-stationary financial time series analysis." Appl. Stochastic Models Bus. Ind., 19: 245-268 (2003).

IBM, "IBM Systems, IBM PowerExecutive Installation and User's Guide," Version 2.10, 62 pp. (Aug. 2007).

(56) References Cited

OTHER PUBLICATIONS

Kalpakis, K. et al., "Distance measures for effective clustering of ARIMA time-series,"Data Mining, 2001. ICDM 2001, Proceedings IEEE International Conference on, vol., No., pp. 273-280, 2001.

Keogh, E. et al., "An online algorithm for segmenting time series," Data Mining, 2001. ICDM 2001, Proceedings IEEE International Conference on , vol., No., pp. 289-296, 2001.

Keogh, Eamonn et al., "Segmenting Time Series: A Survey and Novel Approach," Department of Information and Computer Science, University of California, Irvine, California 92697, 15 pp. (2004).

Palpanas, T. et al, "Online amnesic approximation of streaming time series," Data Engineering, 2004. Proceedings. 20th International Conference on , vol., No., pp. 339-349, Mar. 30-Apr. 2, 2004.

Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., No., pp. 433-437, Nov. 8-10, 2004.

Yu, Lean et al., "Time Series Forecasting with Multiple Candidate Models: Selecting or Combining?" Journal of System Science and Complexity, vol. 18, No. 1, pp. 1-18 (Jan. 2005).

Wang, Ming-Yeu et al., "Combined forecast process: Combining scenario analysis with the technological substitution model," Technological Forecasting and Social Change, vol. 74, pp. 357-378 (2007).

Green, Kesten C. et al., "Structured analogies for forecasting" International Journal of Forecasting, vol. 23, pp. 365-376 (2007).

Agarwal, Deepak et al., "Efficient and Effective Explanation of Change in Hierarchical Summaries", The 13$^{th}$ International Conference on Knowledge Discovery and Data Mining 2007, Aug. 12-15, 2007 (10 pages).

Hyndman, Rob J. et al., "Optimal combination forecasts for hierarchical time series", Monash University, Department of Econometrics and Business Statistics, http://www.buseco.monash.edu.au/de)lts/ebs/pubs/w)lapers/ (2007) 23 pages.

SAS Institute Inc., SAS/QC 9.1: User's Guide. Cary, NC: SAS Publications, (2004).

SAS Institute Inc., SAS/QC 13.2 User's Guide. Cary, NC: SAS Publications, (2014).

Wheeler, Donald J., and David S. Chambers. Understanding Statistical Process Control. 2nd ed. Knoxville, Tenn.: SPC Press, 1992.

Wheeler, Donald J. Advanced Topics in Statistical Process Control. Knoxville, Tenn.: SPC Press, 1995.

Montgomery, Douglas C. Introduction to Statistical Quality Control. 6th ed. Hoboken, N.J.: Wiley, 2009.

Cecil Bozarth, Ph.D., Measuring Forecast Accuracy: Approaches to Forecasting : A Tutorial, Published Jan. 25, 2011, 3 pages.

\* cited by examiner

WESTERN ELECTRIC (WE) TESTS:

| RULE | PATTERN DESCRIPTION |
|---|---|
| 1 | ONE POINT BEYOND ZONE A |
| 2 | NINE SEQUENTIAL DATA POINTS IN ZONE C OR BEYOND ON ONE SIDE OF THE CENTRAL LINE (OR 7, 8, 9, 11, 14, OR 20 DATA POINTS) |
| 3 | SIX SEQUENTIAL DATA POINTS STEADILY INCREASING OR STEADILY DECREASING (THE NUMBER OF POINTS IN TEST 3 CAN BE SPECIFIED AS 6, 7, OR 8) |
| 4 | FOURTEEN SEQUENTIAL DATA POINTS ALTERNATING UP AND DOWN |
| 5 | TWO OUT OF THREE SEQUENTIAL DATA POINTS IN ZONE A OR BEYOND |
| 6 | FOUR OUT OF FIVE SEQUENTIAL DATA POINTS IN ZONE B OR BEYOND |
| 7 | FIFTEEN SEQUENTIAL DATA POINT POINTS IN ZONE C ON EITHER OR BOTH SIDES OF THE CENTRAL LINE |
| 8 | EIGHT SEQUENTIAL DATA POINTS ON EITHER OR BOTH SIDES OF THE CENTRAL LINE WITH NO POINTS IN ZONE C |

FIG. 9

SHEWHART RESIDUAL ANALYSIS CUSTOM CONTROL CHART TESTS

| ANOMALY | REMEDIAL ACTION | ANOMALY DESCRIPTION |
|---|---|---|
| 1 | SELECT | 2 OUT OF 2 DATA POINTS BEYOND 3-SIGMA LIMITS |
| 2 | SELECT | 7 OUT OF 7 DATA POINTS BETWEEN 1-SIGMA AND 3-SIGMA LIMITS |
| 3 | FIT | 3 OUT OF 3 DATA POINTS BEYOND 2-SIGMA LIMIT |
| 4 | FIT | 5 DATA POINTS SEQUENTIALLY INCREASE AND WE TEST 1 (ONE DATA POINT BEYOND ZONE A OUTSIDE THE CONTROL LIMITS) |
| 5 | FIT | 5 DATA POINTS SEQUENTIALLY DECREASE AND WE TEST 1 (ONE DATA POINT BEYOND ZONE A OUTSIDE THE CONTROL LIMITS) |

FIG. 10

Tracking Signal Custom Control Chart Tests

| Anomaly | Remedial Action | Anomaly Pattern Description |
|---|---|---|
| 1 | Select | 3 out of 3 data points beyond 3-sigma limits |
| 2 | Select | 5 data points sequentially increasing |
| 3 | Fit | 5 data points sequentially decreasing |
| 4 | Fit | 5 out of 5 data points beyond 2-sigma limit |

TECHNIQUES FOR MONITORING TRANSFORMATION TECHNIQUES USING CONTROL CHARTS

CROSS-REFERENCE TO RELATED APPLICATIONS

The present disclosure claims the benefit of priority under 35 U.S.C. §119(e) to U.S. Provisional Application No. 62/058,848, filed Oct. 2, 2014, the entirety of which is incorporated herein by reference.

TECHNICAL FIELD

The present disclosure generally relates to systems and methods for automated transformation technique monitoring and process control methodology using control charts.

BACKGROUND

Transformation technique specifications are a vital tool in determining subsequent data points from historical time series data. Maintaining a large number of these specifications may present computational challenges. For example, as further data points are received, remedial actions (e.g., specification selection, specification re-parameterization, and generation of output) related to these specifications may occur at inappropriate times. For example, performing a remedial action with respect to the specification every time a data point is received, is impractical and computationally extensive. As a further example, performing a remedial action with respect to the specification at periodic intervals may result in these remedial actions being unnecessarily performed.

SUMMARY

In accordance with the teachings provided herein, systems and methods for applying transformation techniques and using transformation outputs to implement remedial actions are provided.

For example, a system is provided for applying transformation techniques and using transformation outputs to implement remedial actions. The system may include a receiver that receives time series data including a plurality of current data points and one or more specifications for a transformation technique applicable to the time series data. The system may further include a transformation engine that applies the transformation technique to the time series data to produce a plurality of outputs. The system may further include a control engine that determines a set of control limits using a control chart and a set of residual values. The system may further include an anomaly detection engine that generates the set of residual values using the plurality of current data points and the plurality of outputs, wherein each residual value in the set of residual values indicates a difference between a current data point of the plurality of current data points and an output of the plurality of outputs. The anomaly detection engine may additionally identify one or more anomalies of the set of residual values based on the set of control limits and the control chart. The system may further include a remedial-action engine that determines a remedial action for the transformation technique based on the one or more anomalies and performs the remedial action related to the one or more specifications for the transformation technique.

In another example, a non-transitory computer program product, tangibly embodied in a non-transitory machine readable storage medium is provided, the non-transitory computer program product including instructions operable to receive time series data including a plurality of current data points. The computer program product may include further instructions operable to receive one or more specifications for a transformation technique applicable to the time series data. The computer program product may include further instructions operable to apply the transformation technique to the time series data to produce a plurality of outputs. The computer program product may include further instructions operable to generate a set of residual values using the plurality of current data points and the plurality of outputs, wherein a residual value indicates a difference between a current data point of the plurality of data points and an output of the plurality of outputs. The computer program product may include further instructions operable to determine a set of control limits using a control chart and the set of residual values. The computer program product may include further instructions operable to identify one or more anomalies of the set of residual values, wherein anomalies are identified using the set of control limits and the control chart. The computer program product may include further instructions operable to determine a remedial action for the transformation technique based on the one or more anomalies. The computer program product may include further instructions operable to perform the remedial action related to the one or more specifications for the transformation technique.

In still one further example, a computer-implemented method is provided for applying transformation techniques and using transformation outputs to implement remedial actions. The method may include receiving time series data including a plurality of current data points. The computer-implemented method may further include receiving one or more specifications for a transformation technique applicable to the time series data. The computer-implemented method may further include applying the transformation technique to the time series data to produce a plurality of outputs. The computer-implemented method may further include generating a set of residual values using the plurality of current data points and the plurality of outputs, wherein a residual value indicates a difference between a current data point of the plurality of data points and an output of the plurality of outputs. The method may further include determining a set of control limits using a control chart and the set of residual values The method may further include identifying one or more anomalies of the set of residual values, wherein anomalies are identified using the set of control limits and the control chart. The method may further include determining a remedial action for the transformation technique based on the one or more anomalies. The method may further include performing the remedial action related to the one or more specifications for the transformation technique.

BRIEF DESCRIPTION OF THE DRAWINGS

FIG. 9 illustrates an example of a set of Western Electric tests for determining exceptions in a set of residuals using a control chart.

FIG. 10 illustrates an example of a set of custom tests for determining one or more anomalies in a set of residuals using a Shewhart control chart.

Like reference numbers and designations in the various drawings indicate like elements.

DETAILED DESCRIPTION

Figure 1:
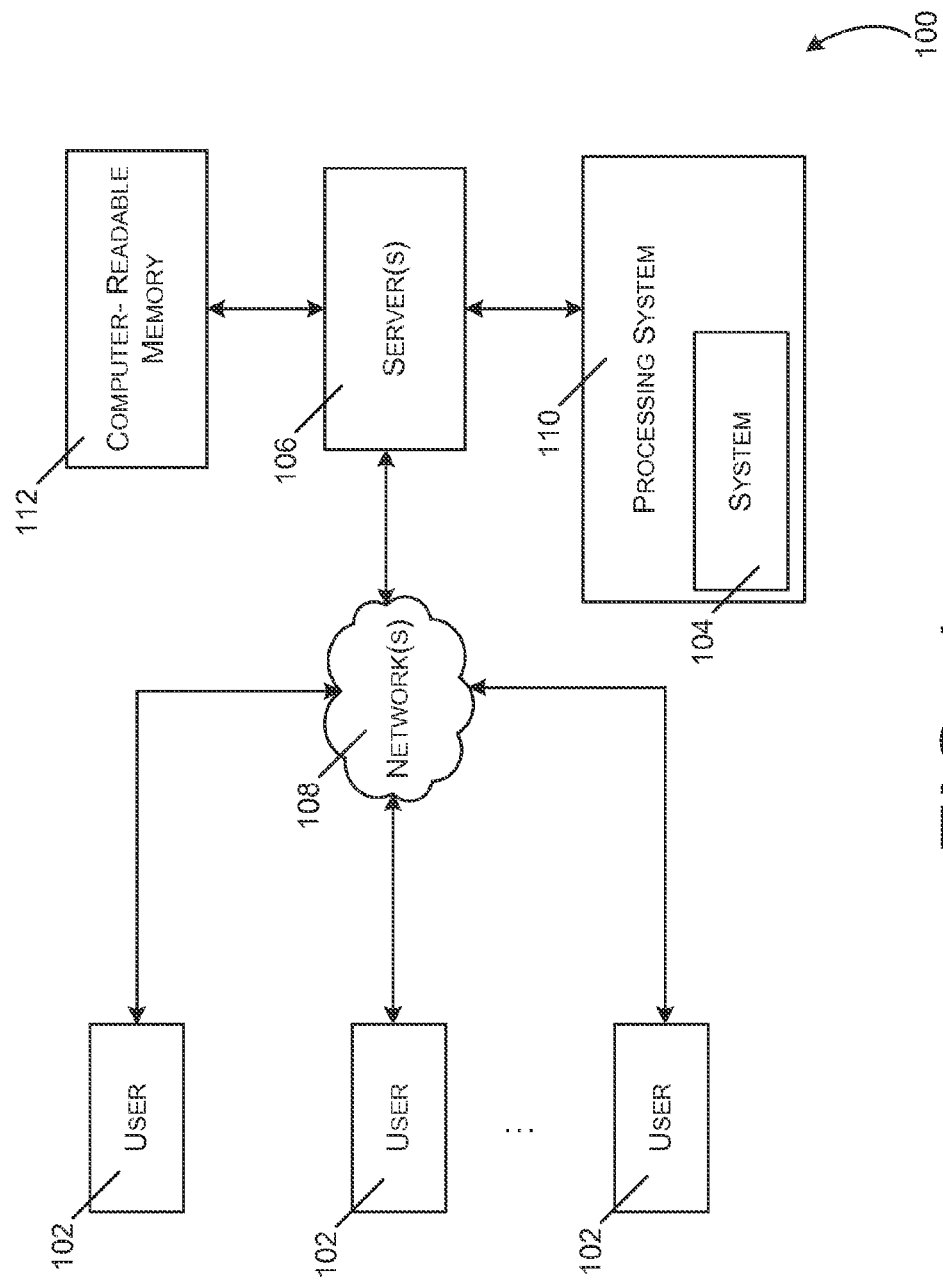
FIG. 1 illustrates a block diagram of an example of a computer-implemented environment for applying transformation techniques and using transformation outputs to implement remedial actions.

Certain aspects of the disclosed subject matter relate to system and methods for automated transformation technique monitoring and process control methodology using control charts. As used herein, a "transformation technique" is intended to refer to forecasting a future data point from historical time series data. Forecasting, or forecast generation, is intended to include the process of making statements about events whose actual outcomes have not yet been observed. Examples of "a transformation technique specification," may include a statistical and/or predictive model such as, a generalized linear model, logistic regression model, ordinary least square regression model, classification model, regression tree model, multivariate adaptive regression spline model, and the like. A "control chart" (e.g., a Shewhart control chart) is intended to refer to a graph used to study how a process changes over time. Data points may be plotted in chronological order on a control chart. A control chart can include a central line for the average, at least one upper control limit and at least one lower control limit, though multiple upper and lower control limits may be utilized. The control limits may be used to determine whether a process is in a state of statistical control. A "tracking signal," as used herein, is a measurement of error that is used to determine whether bias is present in a transformation technique specification. The present disclosure relates to process control methods for automated monitoring of transformation technique specifications using control charts to detect scenarios in which performance of a remedial action may be appropriate.

Predictive modeling is a process used in predictive analytics to create a transformation technique specification (e.g., a predictive model). Predictive analytics is an area of data mining concerned with determining subsequent data points in a time series by applying a transformation technique according to a transformation technique specification. A transformation technique specification may be made up of a number of predictors, which are variable factors that are likely to influence subsequent data points. In predictive modeling, data is collected for the relevant predictors, a transformation technique specification is formulated, predictions are made and the specification is validated (or revised) as additional data becomes available. The specification may employ a simple linear equation or a complex neural network, for example. A "time series," as used herein, is intended to refer to a sequence of data points, typically consisting of successive measurements made over a time interval. References to a "time series" is intended to refer to one or more individual time series unless otherwise specified.

Some transformation technique software tools and technologies may include capabilities for automated specification development, specification selection/comparison, parameter optimization, hierarchical reconciliation, user overrides, exception handling, accuracy determinations, and output generation. Specification families considered may typically include, for example, Exponential Smoothing Models (ESM), Auto-Regressive Integrated Moving Average Models either with or without exogenous variables (ARIMA[X]), Unobserved Components Models (UCM), and Intermittent Demand Models (IDM). Custom or user-defined specifications can be considered as well.

Once specifications are selected and output data points are generated, the resultant specifications may become inaccurate as new data points are added to the historical time series data. Some transformation techniques enable the user to specify a number of remedial actions be performed on the specification(s). For example, a user may cause different a set of specification(s) to be diagnosed and selected (SELECT). Additionally, or alternatively, the user may cause a fit/parameterization (FIT) of a set of current specification(s). Additionally, or alternatively, the user may cause a set of output data points to be updated using the currently selected specification(s) (GENERATE). Current techniques require that each time series must be treated in the same manner. Thus, using current techniques, the specified remedial action (e.g., SELECT, FIT, or GENERATE) is applied to each time series.

Executing such a transformation technique specification development and selection process each time a new data point is added to a time series is impractical and inadvisable as it results in a lack of specification stability and may cause output to fluctuate, in some cases, dramatically. To circumvent this issue, current techniques typically redevelop and reselect specifications periodically. As new data points are added to the time series, such specifications may become inaccurate. Thus, aspects of the current disclosure for managing specifications related to transformation techniques are more efficient, effective and/or avoid undesirable side effects or other drawbacks with respect to at least one significant use case.

FIG. 1 illustrates a block diagram of an example of a computer-implemented environment 100 for applying transformation techniques and using transformation outputs to implement remedial actions. The users 102 can interact with a system 104 hosted on one or more servers 106 through one or more networks 108. The system 104 can contain software operations or routines. The users 102 can interact with the system 104 through a number of ways, such as over the networks 108. The servers 106, accessible through the networks 108, can host the system 104. The system 104 can also be provided on a stand-alone computer for access by a user.

In one example, the environment 100 may include a stand-alone computer architecture where a processing system 110 (e.g., one or more computer processors) includes the system 104 being executed on it. The processing system 110 has access to a computer-readable memory 112.

In one example, the environment 100 may include a client-server architecture. The users 102 may utilize a PC to access the servers 106 running the system 104 on the processing system 110 via the networks 108. The servers 106 may access the computer-readable memory 112.

Figure 2:
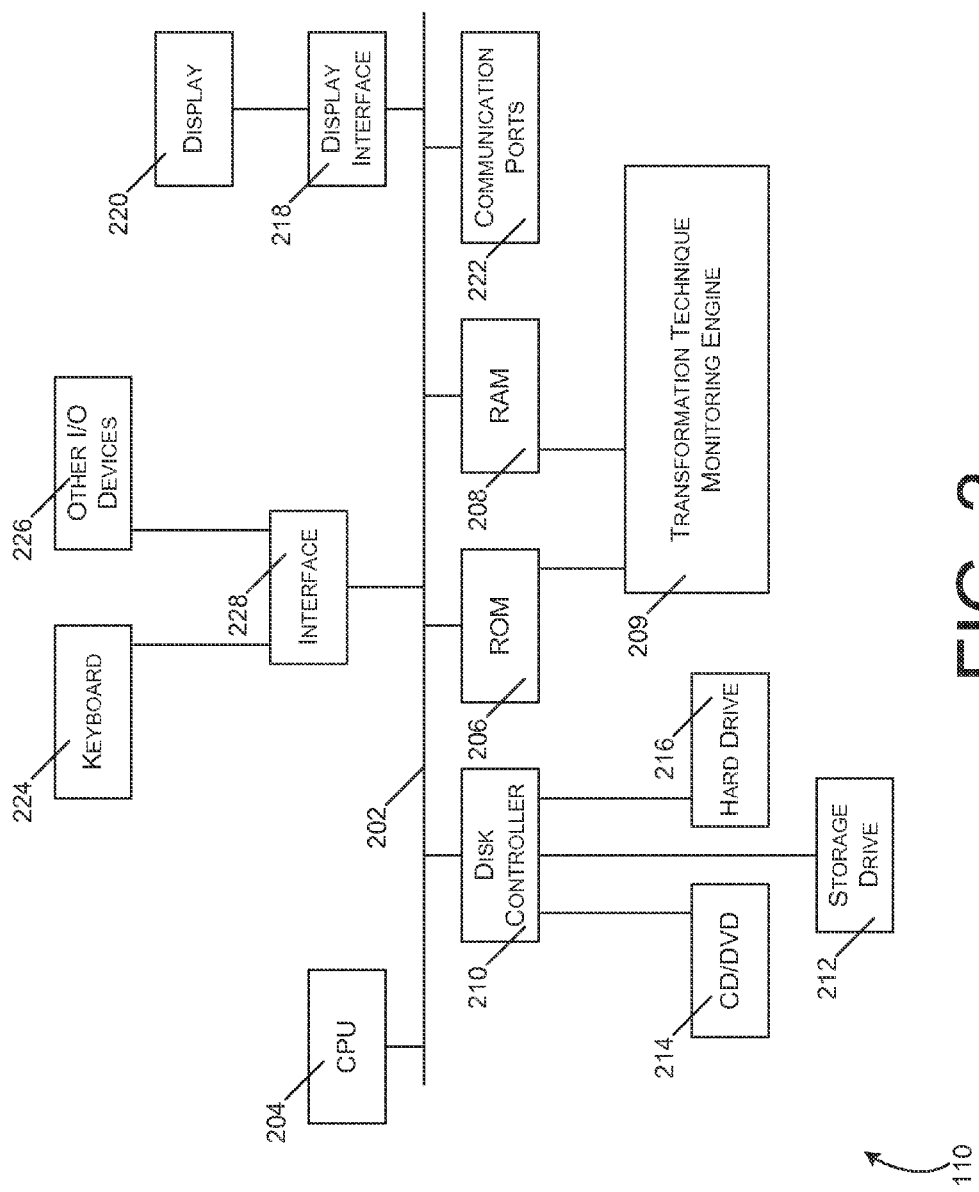
FIG. 2 illustrates a block diagram of an example of a processing system of FIG. 1 for applying transformation techniques and using transformation outputs to implement remedial actions.

FIG. 2 illustrates a block diagram of an example of a processing system 110 of FIG. 1 for applying transformation techniques and using transformation outputs to implement remedial actions. A bus 202 may interconnect the other illustrated components of the processing system 110. A central processing unit (CPU) 204 (e.g., one or more computer processors) may perform calculations and logic operations used to execute a program. A processor-readable storage medium, such as a read-only memory (ROM) 206 and a random access memory (RAM) 208, may be in communication with the CPU 204 and may contain one or more programming instructions. Optionally, program instructions may be stored on a computer-readable storage medium, such as a magnetic disk, optical disk, recordable memory device, flash memory, or other physical storage medium. Computer instructions may also be communicated via a communications transmission, data stream, or a modulated carrier wave. In one example, program instructions implementing transformation technique monitoring engine 209, as described further in this description, may be stored on a storage drive 212, a hard drive 216, a read-only memory (ROM) 206, a random-access memory (RAM) 208, or may exist as a stand-alone service external to the stand-alone computer architecture.

Some or all of the process described in relation to transformation technique monitoring engine 209 may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

A disk controller 210 can interface with one or more optional disk drives to the bus 202. These disk drives may be external or internal floppy disk drives such as a storage drive 212, external or internal CD-ROM, CD-R, CD-RW, or DVD drives 214, or external or internal hard drive 216. As indicated previously, these various disk drives and disk controllers are optional devices.

A display interface 218 may permit information from the bus 202 to be displayed on a display 220 in audio, graphic, or alphanumeric format. Communication with external devices may optionally occur using various communication ports 222. In addition to the standard computer-type components, the hardware may also include data input devices, such as a keyboard 224, or other input/output devices 226, such as a microphone, remote control, touchpad, keypad, stylus, motion, or gesture sensor, location sensor, still or video camera, pointer, mouse or joystick, which can obtain information from bus 202 via interface 228.

Figure 3:
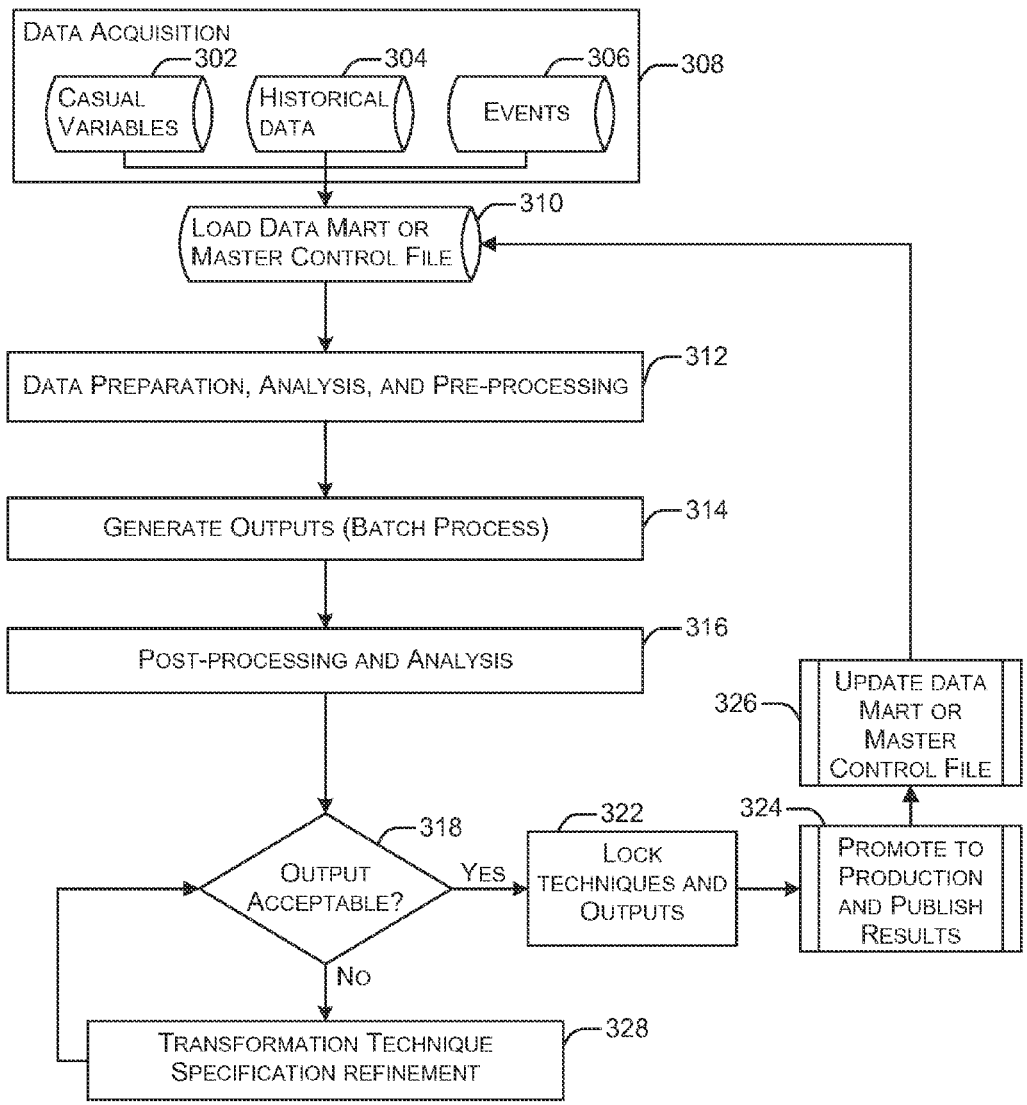
FIG. 3 illustrates a block diagram of an example transformation technique specification development process.

FIG. 3 illustrates a block diagram of an example transformation technique specification development process 300. In accordance with at least one embodiment, a transformation technique specification may refer to a predictive model. The example transformation technique specification development process 300 illustrates, for example, a development process for a predictive model. For example, during a data acquisition phase of the development process, causal variables 302, historical data 304, and event data 306 may be acquired at block 308. A portion of the data acquired at 308 may be loaded in a data mart and/or a master control file at 310.

In accordance with at least one embodiment, data preparation, analysis, and pre-processing techniques may be performed on the loaded data at block 312. For example, such techniques may include data visualization, outlier/anomaly detection, data cleansing, and segmentation/clustering. Visualization may include tasks that provide a visual representation and/or report generation related to the data loaded at 310. Outlier/Anomaly detection may include tasks related to the identification of unusual data records or data errors within the loaded data. Data cleansing may include tasks related to the removal or correction of identified outliers and/or anomalies from the loaded data. Segmentation and/or clustering may include tasks related to discovering groups and structures that indicate relationships between variables and/or data points included in the loaded data.

In accordance with at least one embodiment, a number of outputs (e.g., forecasted data points) may be generated at block 314. During a process for generating the outputs, hierarchy and specification options, for example, may be identified. Additionally, transformation technique specifications (e.g., predictive models) may be created, selected, and/or fitted prior to or subsequent to producing the number of outputs.

In accordance with at least one embodiment, post-processing and analysis techniques may be performed on a selected transformation technique specification at block 316. For example, such techniques may include visualization of results, specification evaluation, exception identification, reporting, and specification performance monitoring and tracking. Performance monitoring and tracking may include evaluating performance of the outputs produced by the applying the transformation technique associated with the transformation technique specification to time series data.

At decision block 318, a determination may be made as to whether the output is acceptable (e.g., falls within quality threshold amount). If the output is not acceptable (e.g., the specification is inaccurate based on the evaluations of block 316), then the flow may proceed to 320 where the transformation technique specification (e.g., the predictive model) may be refined.

In accordance with at least one embodiment, if a determination is made at decision block 318 that the output is acceptable (e.g., based on the evaluations of block 316), then the flow may proceed to 322 where the transformation technique specification(s) and outputs may be "locked," or otherwise assigned, to a time series data set.

In accordance with at least one embodiment, the transformation technique specification may be promoted to production and corresponding results published at block 324. At block 326, the data mart and/or master control file may be updated and the process may repeat from block 310.

In accordance with at least one embodiment, if a determination is made at decision block 318 that the output is not acceptable (e.g., based on the evaluations of block 316), then the flow may proceed to 328 where the transformation technique specification(s) may be refined (e.g., a new specification selected, parameterize the current specification, and/or generate output using the current specification).

Figure 4:
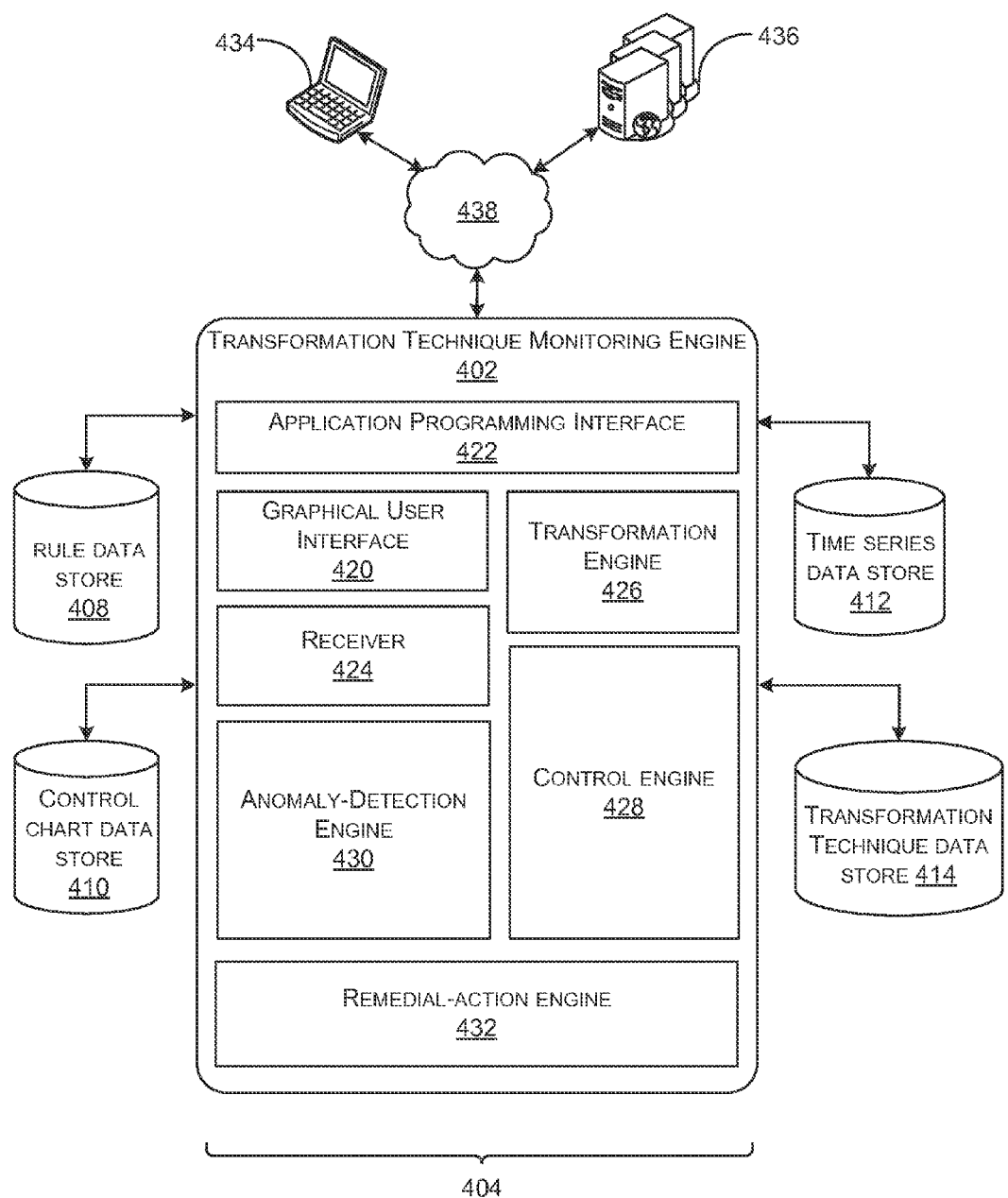
FIG. 4 illustrates an example architecture of the transformation technique monitoring engine, in accordance with at least one embodiment.

FIG. 4 illustrates an example architecture 400 of a transformation technique monitoring engine 402 (e.g., the transformation technique monitoring engine 209 of FIG. 2), in accordance with at least one embodiment. The transformation technique monitoring engine 402 may include a plurality of modules that may carry out various embodiments. The modules 404 may be software modules, hardware modules, or a combination thereof. If the modules 404 are software modules, the modules 404 can be embodied on a computer-readable medium and processed by a processor in any of the computer systems described herein. The modules 404 may be configured in the manner suggested in FIG. 4 or the modules 404 may exist as separate modules or services external to the transformation technique monitoring engine 402. These modules are directed to performing actions of the transformation technique monitoring engine 402 with respect to providing remedial actions to transformation technique specifications. The overall goal of the transformation technique monitoring engine is to improve computational performance of CPU 204 of FIG. 2 during operations utilizing transformation techniques and time series data.

In the embodiment shown in the drawings, rule data store 408, a control chart data store 410, a time series data store 412, and a transformation technique data store 414 are shown, although data can be maintained, derived, or otherwise accessed from various data stores, either remotely or locally, to achieve the functions described herein. The transformation technique monitoring engine 402, shown in FIG. 4, includes various modules such as a graphical user interface 420, an application programming interface 422, a receiver 424, a transformation engine 426, a control engine 428, an anomaly-detection engine 430, and a remedial-action engine 432. Some functions of these modules are described below. However, for the benefit of the reader, a brief, non-limiting description of each of the modules is provided in the following paragraphs.

In accordance with at least one embodiment, a process is enabled for utilizing the transformation technique monitoring engine 402. For example, a user (e.g., a user of users 102 in FIG. 1) may utilize device(s) 434 (e.g., processing system 110 of FIG. 1) to interact with server(s) 436 (e.g., the server(s) 106 of FIG. 1) to utilize the functionality of transformation technique monitoring engine 402. The device(s) 434 and the server(s) 436 may be configured to communicate with networks 438 (e.g., the networks 108 of FIG. 1). For example, transformation technique monitoring engine 402 may be executed on the servers 436 or on the device(s) 434.

In accordance with at least one embodiment, a user may utilize device(s) 434 to request initiation of a monitoring process for one or more transformation technique specification(s). Additionally, or alternatively, servers 436 may transmit a request to initiate a monitoring process of one or more transformation technique specification(s). In either case, such a request may be received via graphical user interface 420 and application programming interface 422, both components of the transformation technique monitoring engine 402. In some instances, the request may be generated automatically by a triggering event (e.g., upon elapse of a specified time period, on a specified date/time, etc.).

In accordance with at least one embodiment, receiver 424, a component of the transformation technique monitoring engine 402, may receive or obtain time series data. For example, the receiver 424 may interact with time series data store 412 to obtain time series data. The time series data store 412 may be a data store responsible for storing data associated with one or more time series. Additionally, the receiver 424 may receive or obtain transformation technique specifications from, for example, the transformation technique data store 414, a data store responsible for storing such specification(s). Upon receiving and/or obtaining times series data and one or more transformation technique specifications, the receiver 424 may communicate such information to the transformation engine 426, a component of transformation technique monitoring engine 402.

In accordance with at least one embodiment, the transformation engine 426 may apply a transformation technique defined by the transformation technique specification to a data to produce a set of outputs. The set of outputs may include a number of predicted data points for a time series that indicate one or more predicted data values. The transformation engine 426 may communicate the set of outputs to anomaly-detection engine 430, a component of transformation technique monitoring engine 402.

In accordance with at least one embodiment, anomaly-detection engine 430, may receive, or otherwise obtain, a set of outputs from transformation engine 426. The anomaly-detection engine 430 may generate a set of residual values using the time series data and the set of outputs. A "residual value" is intended to refer to a computed difference between the observed value of a data point and a predicted value of the data point. In at least one example, the set of residual values may be generated by determining a difference between each current data point of the time series and a corresponding predicted data point of the set of outputs. The anomaly-detection engine 430 may obtain a number of rules and/or tests from, for example, rule data store 408, a data store responsible for storing such rules/tests. Additionally, anomaly-detection engine 430 may obtain one or more control charts from control chart data store 410, a data store responsible for storing one or more control charts. In at least one example, the anomaly-detection engine 430 may utilize the set of residuals, the one or more control charts, and the one or more rules/tests to identify exceptions and/or anomalies within the set of outputs. The anomaly-detection engine 430 may interact with control engine 428, and/or remedial-action engine 432, both components of the transformation technique monitoring engine 402.

In accordance with at least one embodiment, the control engine 428 may receive, or otherwise obtain a control chart and a set of residual values. For example, control engine 428 may obtain a control chart from control chart data store 410. The control engine 428 may obtain a set of residual values from the anomaly-detection engine 430. The control engine 428 may utilize the control chart and the set of residuals to determine a set of control limits. In at least one example, control engine 428 may calculate a tracking signal. A "tracking signal" is a measurement of error that is used to determine whether bias is present in a transformation technique specification. In at least one example, the calculated tracking signal may be used to construct control limits. The tracking signal may be computed, for example, as follows:

$$TS = \frac{\text{Running Sum of the Residuals } (RSR)}{\text{Mean Absolute Deviation } (MAD)} = \frac{\sum_{i=1}^{n}(F_i - A_i)}{\frac{1}{n}\sum_{i=1}^{n}|F_i - A_i|}$$

Where $F_i$ represents the transformation/forecast value in period i, $A_i$ represents an actual value (e.g., in the time series data) in period i, and n represents the number of periods considered. At any suitable time, the calculated tracking signal may be converted to units of standard deviation (1 MAD=0.798 standard deviations) for later use in a control chart.

Control limits may be communicated to the anomaly-detection engine 430 or any suitable component of the transformation technique monitoring engine 402.

In accordance with at least one embodiment, remedial-action engine 432 may receive information related to one or more identified anomalies. For example, remedial-action engine 432 may receive identification information related to one or more anomalies identified by anomaly-detection engine 430. The remedial-action engine 432 may determine one or more remedial actions (e.g., SELECT, FIT, GENERATE) for the transformation technique based on the one or more anomalies. For example, the remedial-action engine 432 may utilize one or more rules/tests from rule data store 408 to determine the one or more remedial actions. The remedial-action engine 432 may perform the determined remedial actions on one or more transformation technique specifications. The remedial-action engine 432 may cause modified transformation technique specifications to be stored in transformation technique data store 414.

The modules described above provides an efficient and robust capability to determine when it is advisable to select, fit/parameterize, or generate output from one or more transformation technique specifications on an individual specification basis. Information related to actions performed by modules 404 may, at any suitable time, be displayed to a user of device(s) 434 via graphical user interface 420.

Figure 5:
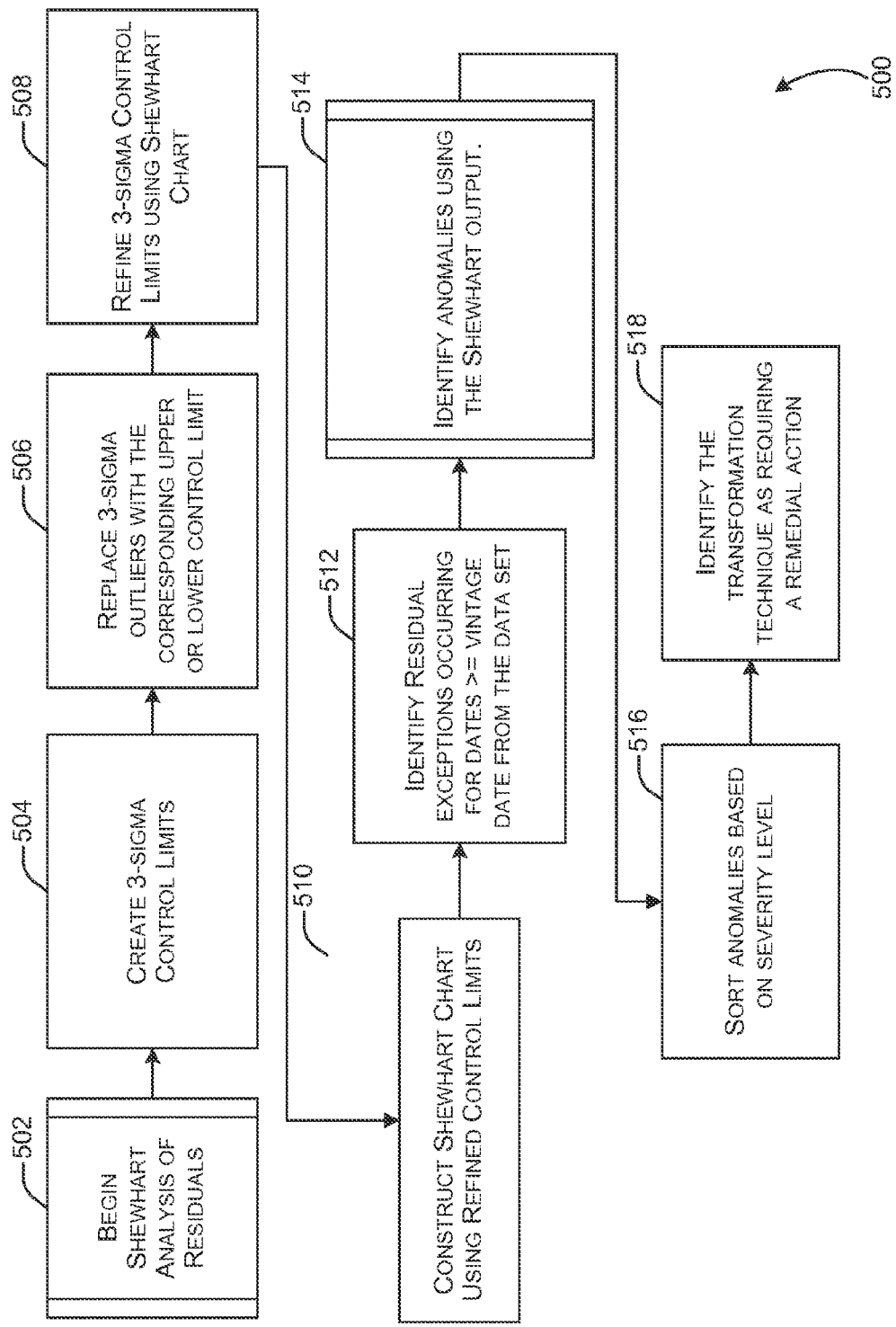
FIG. 5 illustrates an example of a flow diagram for determining control limits for a set of residuals using a Shewhart control chart.

FIG. 5 illustrates an example of a flow diagram 500 for determining control limits for a set of residuals using a Shewhart control chart. It should be understood, that if application of a transformation technique has produced a perfectly predicted set of outputs (E.g., identical values with respect to the time series data), all residuals would be zero. Residual values can be either positive (output>actual) or negative (output<actual). If the transformation technique specification is in a state of statistical control, the residuals should be centered on a mean of zero and should appear random with no specific patterns evident.

The flow diagram 500 may begin at block 502. At block 504, 3-sigma upper and lower control limits may be determined using a Shewhart control chart by, for example, the control engine 428 of FIG. 4. For example, the Shewhart control chart may be initialized with a mean (p) equal to 0. A set of residuals may be plotted on the Shewhart control chart. The plotted chart may be optionally displayed to a user via graphical user interface 420 of FIG. 4.

At block 506, the determined control limits from block 504 may be refined. For example, the 3-sigma upper and lower control limits may be refined using a set of rules/tests (e.g., Western Electric tests). Western Electric rules/tests may be used for detecting out-of-control or non-random conditions in a control chart. In at least one example, Western Electric tests may identify exceptions in the control chart by identifying one or more outliers of the set of residuals. In at least one example, residual data points identified as outliers may be replaced with a corresponding upper or lower control limit.

At block 508, the determined control limits from block 506 may be refined using a second control chart with μ=0. The plotted chart may be optionally displayed to a user.

At block 510, the control limits from block 508 may be even further refined using a third control chart. For example, the third control chart may utilize Western Electric tests and a set of custom tests over a region including a vintage date. A "vintage date" is intended to refer to a date at which the specification for the transformation technique was last selected, or fitted/parameterized.

At block 512, exceptions may be identified in the set of residuals using a combination of the Western Electric tests and custom tests created using the third control chart. Such exceptions may be identified for dates that are, for example, greater than or equal to the vintage date.

At block 514, one or more anomalies may be identified from the exceptions identified at block 512. An anomaly may be associated with a remedial action (e.g., SELECT, FIT, GENERATE). Remedial actions may be prioritized according to a computational cost. For example, SELECT may be prioritized above FIT, while FIT may be prioritized above GENERATE. A computational cost may correspond to the computational requirements for performing the remedial action. For example, reselecting a transformation technique specification may be computationally more extensive, and thus more computationally costly, than fitting a transformation technique specification. Similarly, fitting a transformation technique specification may be computationally more extensive, and thus more computationally costly, than generating a set of output data points using the currently selected transformation technique specification. The prioritization scheme described above is illustrative in nature; any suitable prioritization scheme may be utilized.

At block 516, the one or more anomalies may be sorted according to a computation cost associated with corresponding remedial actions. In at least one example, a most computational costly anomaly may be determined and retained. For example, it may be the case that two anomalies are identified at block 514. The two anomalies may individually correspond to a SELECT remedial action and a GENERATE remedial action. Accordingly, the anomalies may be sorted such that the anomaly corresponding to the SELECT remedial action is retained according to the prioritization scheme described above.

At block 518, a transformation technique specification may be identified as requiring a remedial action. For example, a list, or other parameter, may be updated to indicate that the transformation technique corresponding to the set of residuals may require the identified remedial action from block 516.

Figure 6:
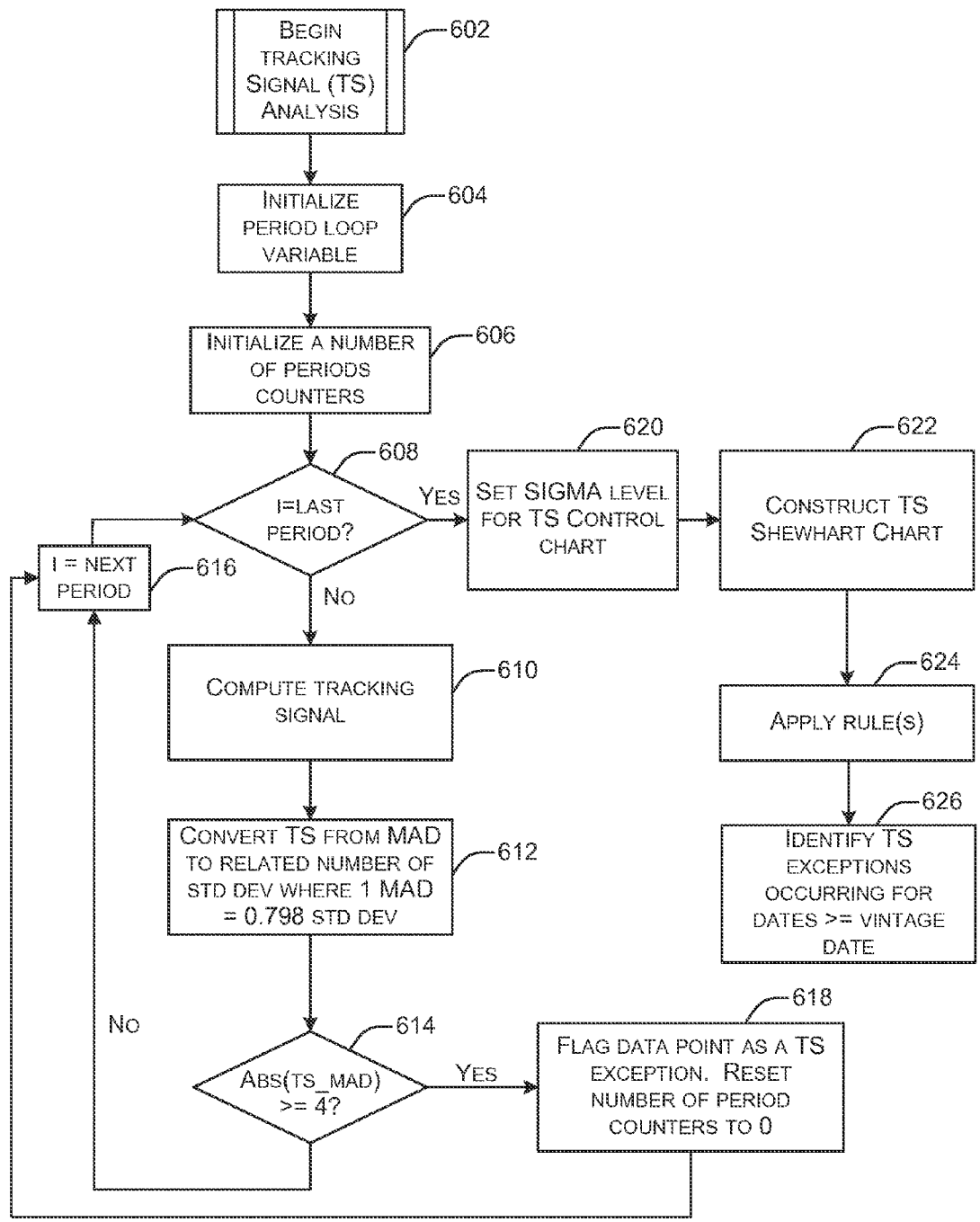
FIG. 6 illustrates an example of a flow diagram for processing a set of residuals using a tracking signal.

FIG. 6 illustrates an example of a flow diagram 600 for a process for analyzing a set of residuals using a tracking signal. A tracking signal may be used as an alternative to, or in conjunction with, a Shewhart control chart process discussed above in connection with FIG. 5.

The flow diagram 600 may begin at 602. At block 604, a period loop variable (i) may be initialized to the value of 1. At block 606, a number of counters (e.g., Running Sum of the Absolute Residuals (RSAR) and Running Sum of the Residuals RSR) may be initialized. A determination may be made at decision block 608 as to whether i is equal to the last period in the set of residuals.

If i is not the last time period in the set of residuals at decision block 608, the flow may proceed to block 610 where the tracking signal may be computed, for example, as follows:

$$TS = \frac{\text{Running Sum of the Residuals } (RSR)}{\text{Mean Absolute Deviation } (MAD)} = \frac{\sum_{i=1}^{n}(F_i - A_i)}{\frac{1}{n}\sum_{i=1}^{n}|F_i - A_i|}$$

Where Fi represents the transformation/forecast value in period i, Ai represents an actual value (e.g., in the time series data) in period i, and n represents the number of periods considered. At block 612, or at any suitable time, the computed tracking signal from block 610 may be converted to units of standard deviation (1 MAD=0.798 standard deviations) for later use in a control chart.

At decision block 614, a determination may be made as to whether or not the absolute value of the tracking signal in MAD units (abs(TS_MAD)) is greater than or equal to 4. If abs(TS_MAD) is not greater than or equal to 4, then no bias has been detected in the transformation technique specification, and the flow may proceed to block 616, where i may be set to the next period in the set of residuals in order to be reevaluated at decision block 608.

If the abs(TS_MAD) is determined to be greater than or equal to 4 at block 620, then the flow may proceed to block 618 where the residual data point may be flagged, or otherwise identified, as a tracking signal exception. Additionally, period counters such as RSR and RSAR may be set to 0 at block 618. The flow may proceed to block 616 where i may be set to the next period in the data set in order to be reevaluated at decision block 608.

If i is determined to be the last time period in the set of residuals at decision block 608, the flow may proceed to block 620 where SIGMA levels (e.g., control limits) for a tracking signal control chart may be set. For example, sigma levels for a control chart may be initialized with an upper control limit of 3.192 (4 MAD converted to standard deviation units) and a lower control limit of −3.192 (−4 MAD converted to standard deviation units). At block 622, a tracking signal may be plotted on a Shewhart control chart using the sigma control levels from block 620 and a mean(mu) value of 0. At block 624, one or more tests (e.g., Western Electric tests and/or custom tests) may be applied over the entire region. At block 626, tracking signal exceptions may be identified for dates occurring on or after the vintage date. One or more anomalies may be identified for each tracking signal exception in a similar manner as described in connection with FIG. 6.

Figure 7:
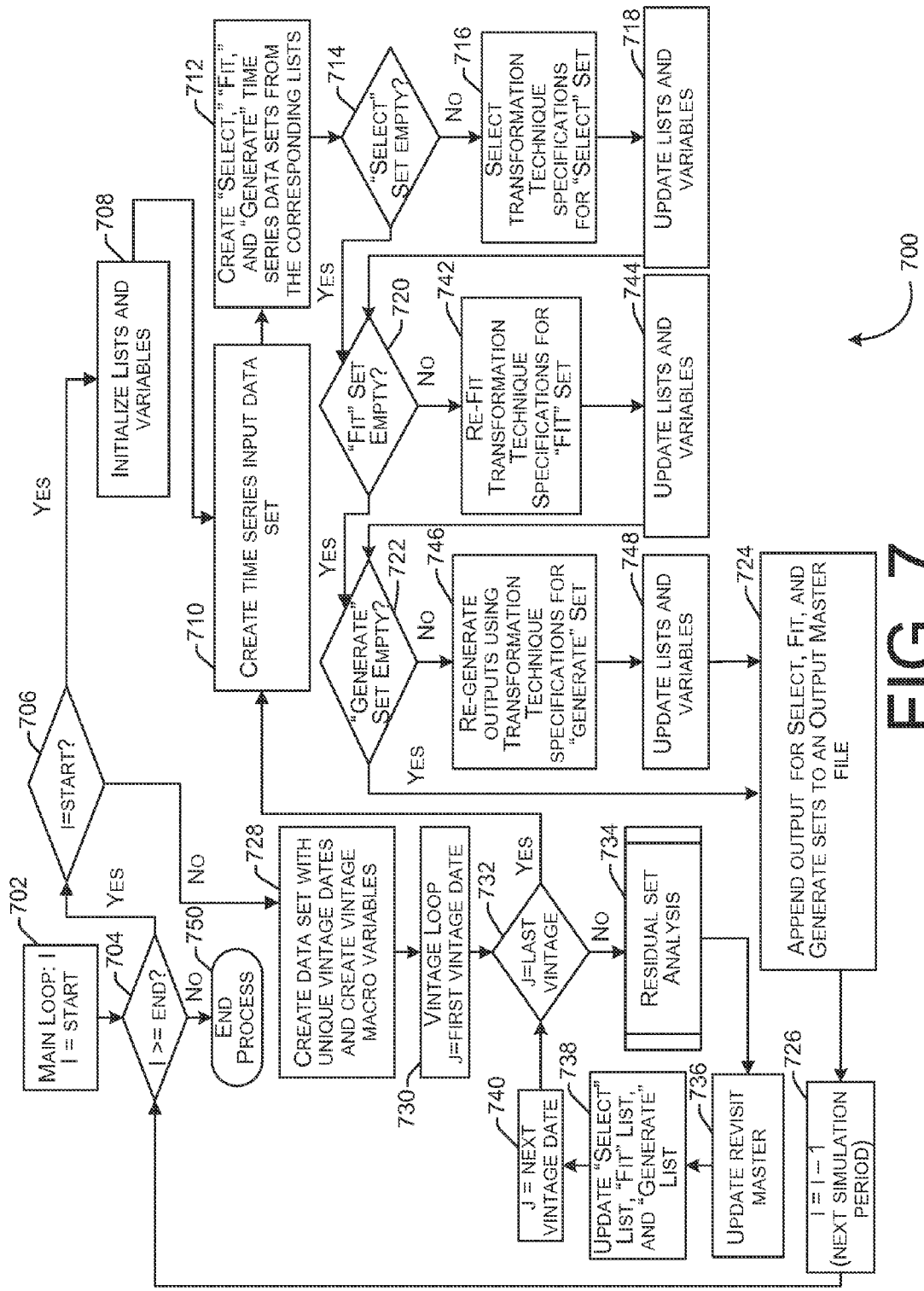
FIG. 7 illustrates an example of a flow diagram for performing remedial actions on a number of transformation technique specifications, in accordance with one embodiment.

FIG. 7 illustrates an example of a flow diagram 700 for a process for performing remedial actions on a number of transformation technique specifications, in accordance with one embodiment. The flow diagram 700 may begin at block 702 where a main loop variable i is declared and initialized to a start value (e.g., the start value may be a number of periods in the past, calculated from the end date, where the start value indicate a date from which to begin the analysis). The flow may proceed to block 704, where a determination may be made as to whether or not i is greater than or equal to an end value. If i is greater than or equal to the end value, the flow may proceed to decision block 706. If i equals the start value at decision block 706, the flow may proceed to block 708. At block 708, a number of lists and variables may be initialized. For example, a revisit_master set of variables may be initialized. A number of variables of the revisit_master set may correspond to an individual time series. In at least one example, the revisit_master set may include a variable for each time series that may be used to indicate that each time series requires a transformation technique specification selection. In at least one example, the revisit_master set may include additional variables for each time series including, but not limited to, a data set specification selection date, a specification date, a specification fit/parameratized date, and/or a run date.

In at least one example, one or more remedial action lists may be initialized at block 708. For example, a remedial action list corresponding to time series in need of transformation technique specification selection (e.g., a "SELECT" list) may be initialized. Similarly, a remedial action list corresponding to time series associated with a transformation technique specification in need of fit/parameterization (e.g., a "FIT" list) may be initialized. Further, a remedial action list corresponding to time series associated with a transformation technique specification that needs to be executed to generate a new set of outputs (e.g., a "GENERATE" list) may be initialized. In one example, the "SELECT" list may be initialized with indicators for all the time series. The "FIT" list and the "GENERATE" list may each be initialized to NULL (e.g., an empty value). Thus, at block 708, the "SELECT" list may indicate that each time series requires a transformation technique specification to be selected.

The flow may proceed to block 710, where a time series input data set may be created for each time series. For example, data points for a time series may be included in a time series input data set for dates that occur after an end date. The end date may be utilized to structure the time series input data set. An end date may be used when, for example, causal/independent variables are provided but actual values for a target forecast variable for future period is unknown.

The flow may proceed to decision block 712, where "SELECT," "FIT," and "GENERATE" time series data sets may be created from the corresponding lists. Thus, in the current example, each time series may have "SELECT" time series data sets created.

The flow may proceed to block 714 where a determination as to whether the "SELECT" time series set is empty. Continuing with the current example, the "SELECT" set includes time series data sets for each time series, thus, the flow may proceed to block 716 where a transformation technique specification may be selected for each time series in the "SELECT" set. In at least one example, a predefined procedure for transformation technique specification selection may be utilized. For instance, procedure that diagnose statistical characteristics of a time series to identify an appropriate transformation technique specification may be used. An example of one such procedure includes "HPFDiagnose", an algorithm included in SAS® Forecast Server Procedures (part of SAS® Forecast Server). HPFDiagnose, or similar procedures, may consider numerous types of transformation technique specifications capable of being applied to each time series. HPFDiagnose, or similar procedures, may determine autoregressive and moving average orders, detect outliers, and select best input variables. The HPFDiagnose procedure results in output such as transformation technique specifications for multiple types of specifications and a selection list of transformation technique specifications. Such output may be used as input for execution with a selection procedure, for example, HPFEngine, utilizing a task parameter "SELECT," in order to select a particular transformation technique specification for each time series.

Upon selection of a transformation technique specification for each time series, the flow may proceed to block 718 where various lists and variables may be updated. For example, the revisit_master set variables may be updated.

The flow may proceed to block 720, where a determination as to whether or not the "FIT" set is empty. Given the ongoing example, the "FIT" set may be determined to be empty and the flow may proceed to block 722, where the "GENERATE" set may also be determined to be empty. The flow may proceed to block 724, where output for the "SELECT," "FIT," and "GENERATE" sets may be appended to an output master file, for example. The flow may proceed to block 726, where i may be decremented to the next period and the flow may proceed back to block 704.

Continuing with the ongoing example, a determination may be made at block 704 that i is greater than the end date. Thus, the flow may proceed to decision block 706 where it may be determined that i is no longer equal to the start date. Given such a determination, the flow may proceed to block 728 where a vintage set including, but not limited to, unique vintage dates and vintage macro variables may be created. The flow may proceed to 730, where a vintage loop variable j may be set to the first vintage date in the vintage set.

The flow may proceed to block 732, where a determination may be made as to whether j is equal to the last vintage date in the vintage set. If j is not equal to the last vintage date in the vintage set, the flow may proceed to block 734 where a residual set processing may be performed using one or more control charts. Residual set processing performed at block 734 may include either the process described above in connection with FIG. 5 (e.g., using a Shewhart control chart) or the process described above in connection with FIG. 6 (e.g., using a converted or modified tracking signal with a Shewhart control chart). One or more anomalies may be identified in a set of residuals at block 734. Accordingly, a remedial action for time series associated with the one or more anomalies may be determined.

The flow may proceed to block 736, where the revisit_master set may be updated with information indicating one or more times series for which remedial actions have been identified. The flow may proceed to block 738, where the "SELECT" list, the "FIT" list, and the "GENERATE" list may be updated to indicate time series associated with transformation technique specifications that need to be selected, fit/parameterized, or generated, respectively.

The flow may proceed to block 740, where j may be set to the next vintage date. The flow may then repeat block 732, block 734, block 736, block 738, and block 740 until j equals the last vintage date in the vintage set. At such time, the flow may proceed back to block 710, where, once again, a time series input data set may be created for each time series data set.

The flow may proceed though decision block 712, block 714, block 716, and block 718 as described above. The process may proceed to block 720, where a determination may be made as to whether the "FIT" set is empty. If the "FIT" set is not empty, the flow may proceed to block 742, where transformation technique specifications included in the "FIT" set may be fit. Fitting a transformation technique specification includes, but is not limited to, adjusting parameters and/or variables associated with the transformation technique specification in order to produce a fitted transformation technique specification. A fitted transformation technique specification may produce a set of outputs that fall within an error threshold amount of a set of data points in a time series. A selection procedure, for example, HPFEngine, utilizing a task parameter "FIT", may produce one or more fitted transformation technique specifications for a time series indicated in the "FIT" set. The HPFEngine procedure may select a particular fitted transformation technique specification for each time series indicated in the "FIT" set. Upon selection of a transformation technique specification for each time series, the flow may proceed to block 744 where various lists and variables may be updated. For example, the revisit_master set variables may be updated.

The flow may proceed to block 722, where a determination may be made as to whether or not the "GENERATE" set is empty. If the "GENERATE" set is not empty, the flow may proceed to block 746, where a set of output data points may be generated using the currently selected transformation technique specification for a corresponding time series included in the "GENERATE" set. Upon generating the set of output data points, the flow may proceed to block 748 where various lists and variables may be updated. For example, the revisit_master set variables may be updated.

The flow may proceed through block 724 and block 726 as described above. The process may repeat in the same manner as described above until i equals the end date at block 704. When i equals the end date at block 704, the process may end at block 750.

The flow above enables each time series to be individually monitored and custom remedial actions to be employed, rather than a "one size fits all" manner that exists today in current techniques.

Figure 8:
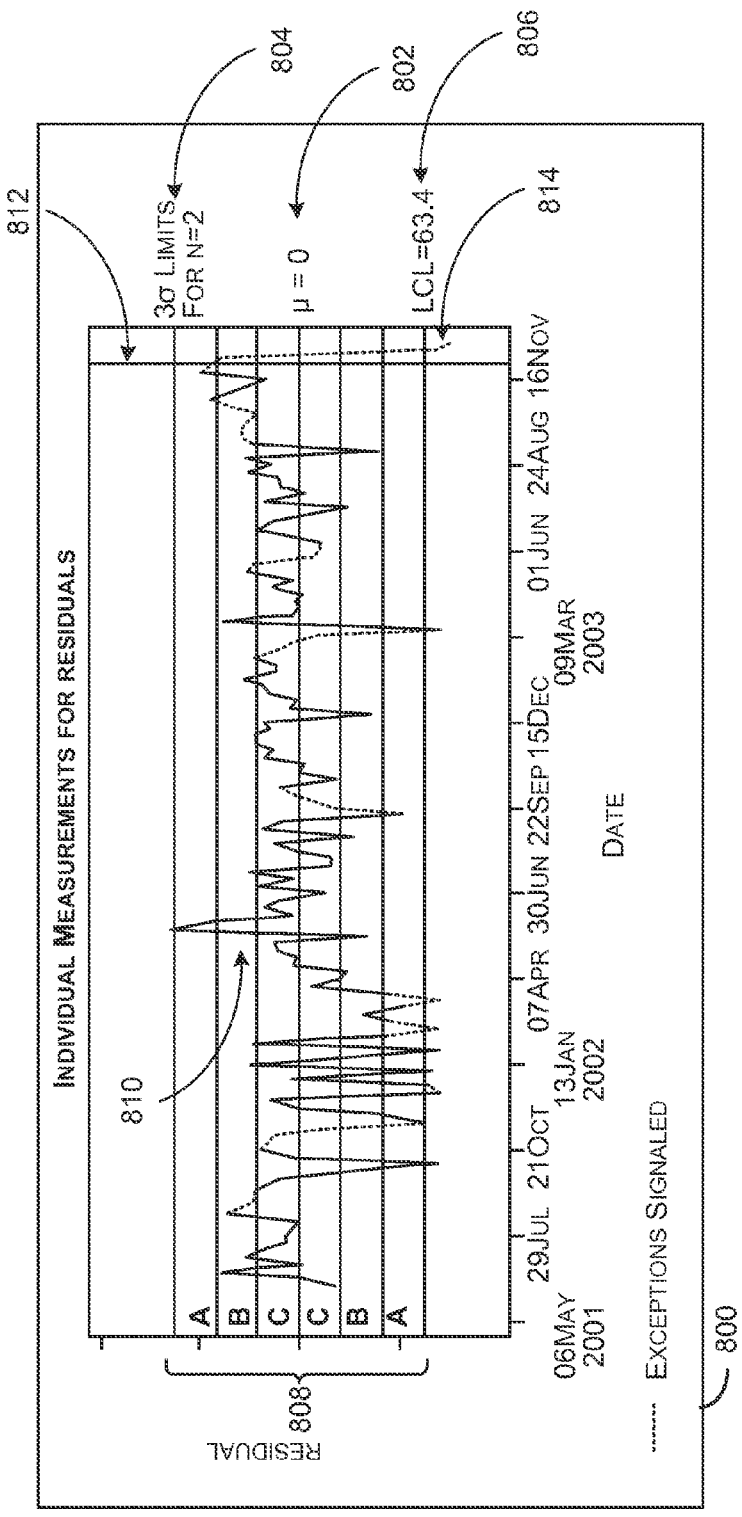
FIG. 8 illustrates an example Shewhart control chart including a plot of a set of residuals.

FIG. 8 illustrates an example Shewhart control chart 800 including a plot of a set of residuals. The Shewhart control chart 800 may include a central line 802, an upper control limit 804, a lower control limit 806, and a set of zones 808. The set of zones 808 may include 3 total zones as indicated in FIG. 8 (e.g., zone A, zone B, and zone C), though any number of zones may be utilized. A set of residual data points 810 may be plotted on the Shewhart control chart 800 according to a time associated with each residual data point. The x-axis of the Shewhart control chart 800 may include time measurements, while the y-axis may indicate residual data point values. A vintage date 812 may be indicated on the Shewhart control chart 800 by a vertical line as depicted in FIG. 8, or by any suitable means. The Shewhart control chart 800 is illustrative of a Shewhart control chart generated on Dec. 28, 2003, using time series data points posted up to, and including, Dec. 21, 2003. Additionally, the Shewhart control chart 800 includes a vintage date of Nov. 30, 2003. Accordingly, only residual data points occurring on or after Nov. 30, 2003 through Dec. 21, 2003 may be considered, in accordance with the processes described herein. Exceptions (indicated in FIG. 8 using dashed lines) may be determined using any suitable combination of Western Electric tests and custom tests. Such tests will be discussed further in connection with FIGS. 9-11. As an illustrative example, data points 814 may test positive as an exception due to multiple consecutive data points falling outside the lower control limit 806 of Shewhart control chart 800. Classification of data points 814 as an exception may cause a remedial action to be performed with respect to a transformation technique specification used to produce outputs that were, in turn, used to produce the residual data points graphed in Shewhart control chart 800.

FIG. 9 illustrates an example of a set of Western Electric tests 900 for determining exceptions in a set of residuals using a control chart (e.g., the Shewhart control chart 800 of FIG. 8). For example, Western Electric tests 900 may include one or more non-random conditions that, if present, indicate an exception in a control chart. The set illustrated in FIG. 9 includes multiple tests. For example, if one data point (e.g., a residual data point) is beyond zone A (e.g., zone A of FIG. 8), the condition for test 1 of the Western Electric tests may be met. If nine sequential data points occur in zone C (e.g., zone C of FIG. 8) or beyond, on one side of the central line (e.g., the central line 802 of FIG. 8), the conditions for test 2 may be met. In at least one example, the number of data points included in test 2 may vary (e.g., 7, 8, 9, 11, 14, 20, etc.). If six sequential data points (or 7 sequential data points, or 8 sequential data points) steadily increase or steadily decrease, the conditions for test 3 may be met. If fourteen sequential data points alternate up and down, the conditions for test 4 may be met. If two out of three sequential data points are in zone A (e.g., zone A of FIG. 8) or beyond, the conditions for test 5 may be met. If four out of five sequential data points occur in zone B (e.g., zone B of FIG. 8), the conditions for test 6 may be met. If fifteen sequential data points occur in zone C (e.g., zone C of FIG. 8) on either, or both sides, of the central line (e.g., the central line 802 of FIG. 8), the conditions for test 7 may be met. If eight sequential data points occur on either or both sides of the central line 802, the conditions for test 8 may be met. FIG. 9 is illustrative in nature, a subset of the tests included in FIG. 9, additional tests not described in FIG. 9, or any suitable combination thereof, may be applied in the processes described above.

FIG. 10 illustrates an example of a set of custom tests 1000 for determining one or more anomalies in a set of residuals using a Shewhart control chart (e.g., the Shewhart control chart 800 of FIG. 8). For example, custom tests 1000 may include one or more anomalies that, if present in a control chart, indicate a necessity to perform a remedial action on a transformation technique specification. Custom tests 1000 may be used alone or in combination with Western Electric tests (e.g., the Western Electric tests 900 of FIG. 9). As discussed above, an anomaly may be associated with a remedial action to be performed on a transformation technique specification. In FIG. 10, anomaly 1 specifies that if 2 out of 2 data points are beyond 3-sigma limits, a transformation technique specification should be selected that better models the time series. Anomaly 2 specifies that if 7 out of 7 data points occur between the 1-sigma and 3-sigma limits, a transformation technique specification should be selected that better models the time series. Anomaly 3 specifies that if 3 out of 3 data points beyond 2-sigma limit, a transformation technique specification should be fit (e.g., re-parameterized) to better model the time series. Anomaly 4 specifies that if 5 data points sequentially increase, and Western Electric test 1 (e.g., test 1 of Western Electric tests 900 of FIG. 9) is met, a transformation technique specification should be fit to better model the time series. Anomaly 5 specifies that if 5 data points sequentially decrease, and Western Electric test 1 is met, a transformation technique specification should be fit to better model the time series. FIG. 10 is illustrative in nature, a subset of the custom tests 1000, additional custom tests not described in FIG. 10, or any suitable combination thereof, may be utilized in the processes described above.

Figure 11:
FIG. 11 illustrates an example of a set of custom tests for determining anomalies in a set of residuals using a tracking signal and a Shewhart control chart.

FIG. 11 illustrates an example of a set of custom tests 1100 for determining anomalies in a set of residuals using a tracking signal and a control chart. FIG. 11 illustrates an example of a set of the custom tests 1100 for determining one or more anomalies in a set of residuals using a converted tracking signal and, for example, a Shewhart control chart. For example, custom tests 1100 may include one or more anomalies that, if present in the Shewhart control chart 800, indicate a necessity to perform a remedial action with respect to a transformation technique specification. Custom tests 1100 may be used alone or in combination with Western Electric tests (e.g., the Western Electric tests 900 of FIG. 9). Anomaly 1 specifies that if 3 out of 3 data points are beyond the 3-sigma limits (e.g., in units of standard deviation), a transformation technique specification should be selected that better models the time series. Anomaly 2 specifies that if 5 data points sequentially increase, a transformation technique specification should be selected that better models the time series. Anomaly 3 specifies that if 5 data points sequentially decrease, a transformation technique specification should be selected that better models the time series. Anomaly 4 specifies that if 5 out of 5 data points are beyond a 2-sigma limit, a transformation technique specification should be selected that better models the time series. FIG. 11 is illustrative in nature, a subset of the custom tests 1100, additional custom tests not described in FIG. 11, or any suitable combination thereof, may be utilized in the processes described above.

Figure 12:
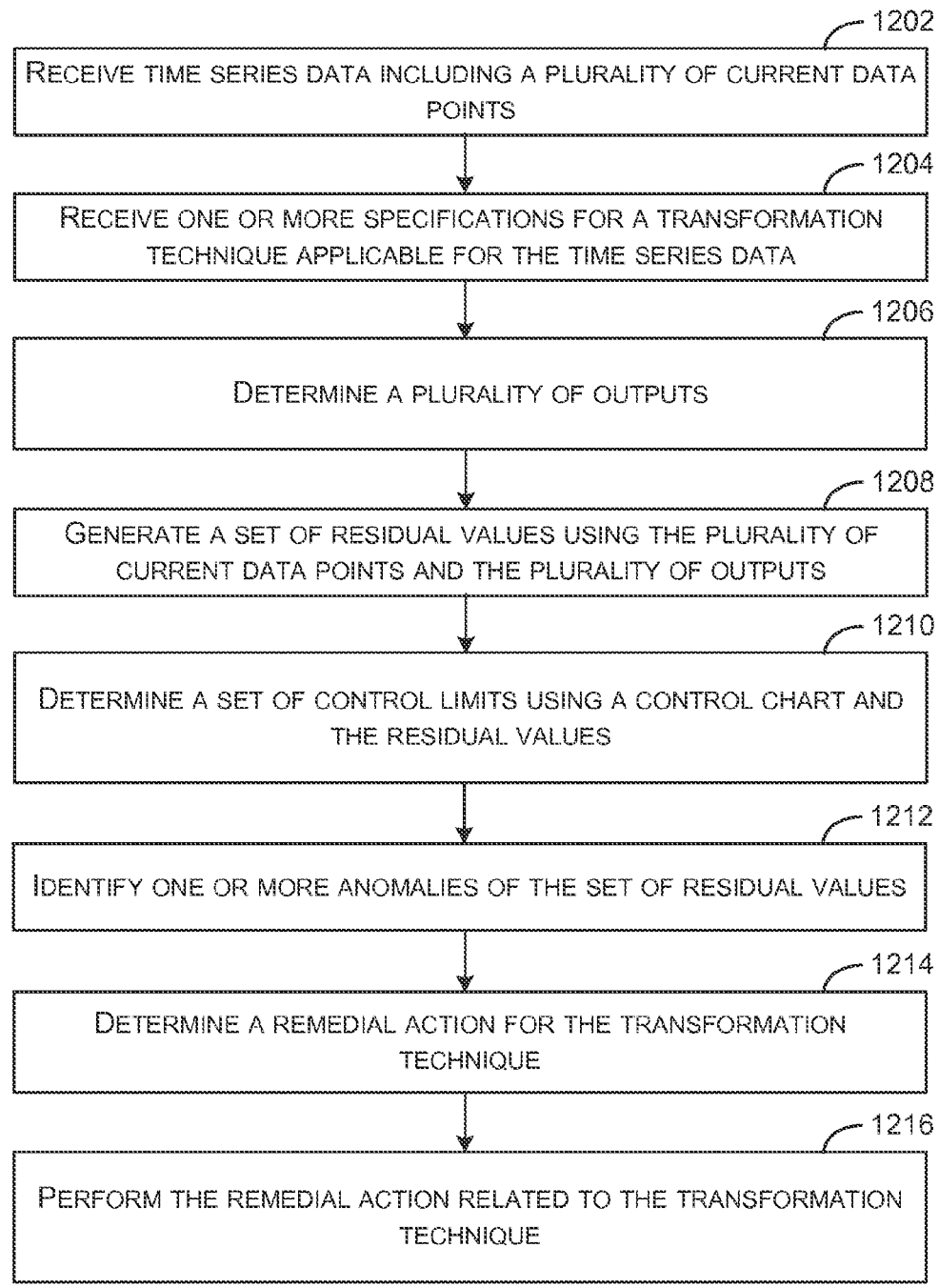
FIG. 12 illustrates an example of a flow diagram for applying transformation techniques and using transformation outputs to implement remedial actions.

FIG. 12 illustrates an example of a flow diagram 1200 for applying transformation techniques and using transformation outputs to implement remedial actions. The flow may begin at block 1202 where time series data including a plurality of current data points may be received (e.g., by receiver 424 of FIG. 4). Receiver 424 may receive one or more specifications for a transformation technique applicable to the time series data at block 1204.

At block 1206, a plurality of outputs may be determined. For example, a transformation technique may be applied to the time series data (e.g., by transformation engine 426 of FIG. 4) to produce a plurality of outputs.

At block 1208, a set of residual values may be generated using the plurality of current data points and the plurality of output (e.g., by the anomaly-detection engine 430 of FIG. 4). Each residual value in the set of residual values may indicate a difference between a current data point of the plurality of current data points and an output of the plurality of outputs.

At block 1210, a set of control limits may be determined (e.g., by control engine 428 of FIG. 4) using a control chart (e.g., a Shewhart control chart) and the set of residual values determined at block 1208. The set of control limits may be determined, for example, by using either or both processes described in connection with FIGS. 5 and 6.

At block 1212, one or more anomalies of the set of residual values may be identified (e.g., by the anomaly-detection engine 430 of FIG. 4). The identification of the one or more anomalies may be based on the set of control limits determined at block 1208 and a control chart.

At block 1214, a remedial action may be determined for the transformation technique (e.g., by the remedial-action engine 432 of FIG. 4). As discussed above, a remedial action may include, but is not limited to, actions that cause a transformation technique specification to be selected, cause a transformation technique specification to be fit/parameterized, or cause a transformation technique specification to be applied to the time series to generate a plurality of outputs. The determined remedial action may be based on, for example, standard and/or custom tests including, but not limited to, the Western Electric tests 900 of FIG. 9, the custom tests 1000 of FIG. 10, the custom tests 1100 of FIG. 11, or any suitable combination thereof.

At block 1216, the remedial action related to the transformation technique may be performed (e.g., by the remedial-action engine 432 of FIG. 4). Thus, a different transformation technique specification may be selected, a current transformation technique specification may be fit/parameterized, or a transformation technique specification to be applied to the time series to generate a plurality of outputs.

Systems and methods according to some examples may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to, or from, a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, (e.g., a mobile telephone, a personal digital assistant (PDA), a tablet, a mobile viewing device, a mobile audio player, a Global Positioning System (GPS) receiver), to name just a few. Computer-readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks; magneto optical disks; and CD ROM and DVD-ROM disks). The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products (i.e., one or more modules of computer program instructions encoded on a computer-readable medium for execution by, or to control the operation of, data processing apparatus). The computer-readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a graphical system, a database management system, an operating system, or a combination of one or more of them).

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS®

LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A forecasting system for applying forecasts and using outputs to implement remedial actions, comprising:
   a receiver that receives:
      time series data including a plurality of current data points; and
      a forecast model for a forecast applicable to the time series data;
   a transformation engine that applies the forecast model to the time series data to produce a plurality of outputs;
   a control engine that determines a set of control limits using a control chart and a set of residual values;
   an anomaly detection engine that:
      generates the set of residual values using the plurality of current data points and the plurality of outputs, wherein each residual value in the set of residual values indicates a difference between a current data point of the plurality of current data points and an output of the plurality of outputs; and
      identifies one or more anomalies of the set of residual values based on the set of control limits and the control chart; and
   a remedial-action engine that:
      determines a remedial action list including a plurality of types of remedial actions;
      assigns a prioritization to the types of remedial actions in the remedial action list, wherein prioritizations are based on computational costs of the remedial actions;
      determines a remedial action for the forecast model based on the prioritizations of the types of remedial actions in the remedial action list and the one or more anomalies; and
      perform the remedial action related to the forecast model.

2. The system of claim 1, wherein an anomaly indicates that a residual value of the set of residual values occurs outside the set of control limits.

3. The system of claim 1, wherein an anomaly indicates that a subset of sequentially residual values incrementally increase.

4. The system of claim 1, wherein identifying one or more anomalies includes determining a vintage date,
   wherein a vintage date indicates a date at which the forecast model was selected or modified, and
   wherein the one or more anomalies are identified for dates occurring on or after the vintage date.

5. The system of claim 1, wherein identifying one or more anomalies includes analyzing the set of residual values using a set of rules, and
   wherein analyzing the set of residual values using the set of rules includes determining a non-random condition in a control chart.

6. The system of claim 1, wherein determining a remedial action for the forecast model further comprises:
   determining a classification for each of the one or more anomalies,
      wherein a classification is associated with a remedial action;
   sorting the classifications using a predetermined prioritization scheme; and
   retaining a classification of the sorted classifications,
      wherein the determined remedial action is associated with the retained classification.

7. The system of claim 1, wherein remedial actions include estimating parameters for the forecast model, applying the forecast model to the time series data to produce a plurality of outputs, or selecting a different forecast model.

8. The system of claim 7, wherein identifying one or more anomalies includes determining that the tracking signal equation has produced an output that exceeds one or more error threshold values.

9. The system of claim 1, wherein identifying one or more anomalies includes analyzing the set of residual values using a tracking signal equation,
   wherein the tracking signal equation uses a sum of the set of residual values and a mean absolute deviation value, and
   wherein analyzing the set of residual values using the tracking signal equation includes determining a non-random condition in a control chart.

10. The system of claim 8, wherein identifying one or more anomalies includes analyzing the set of residual values using the tracking signal equation further includes converting a product of the tracking signal equation using a standard deviation value.

11. A non-transitory computer program product, tangible embodied in a non-transitory machine readable storage medium, including instructions operable to cause a data processing apparatus to:
   receive time series data including a plurality of current data points;
   receive a forecast model for a forecast applicable to the time series data;
   apply the forecast model to the time series data to produce a plurality of outputs;
   generate a set of residual values using the plurality of current data points and the plurality of outputs, wherein a residual value indicates a difference between a current data point of the plurality of data points and an output of the plurality of outputs;
   determine a set of control limits using a control chart and the set of residual values;
   identify one or more anomalies of the set of residual values, wherein anomalies are identified using the set of control limits and the control chart;
   determine a remedial action list including a plurality of types of remedial actions;
   assign a prioritization to the types of remedial actions in the remedial action list, wherein prioritizations are based on computational costs of the remedial actions;

determine a remedial action for the forecast model based on the prioritizations of the types of remedial actions in the remedial action list and the one or more anomalies; and perform the remedial action related to the forecast model.

12. The computer program product of claim 11, wherein an anomaly indicates that a residual value of the set of residual values occurs outside the set of control limits.

13. The computer program product of claim 11, wherein an anomaly indicates that a subset of sequentially residual values incrementally increase.

14. The computer program product of claim 11, wherein identifying one or more anomalies includes determining a vintage date,
wherein a vintage date indicates a date at which the forecast model was selected or modified, and
wherein the one or more anomalies are identified for dates occurring on or after the vintage date.

15. The computer program product of claim 11, wherein identifying one or more anomalies includes analyzing the set of residual values using a set of rules, and
wherein analyzing the set of residual values using the set of rules includes determining a non-random condition in a control chart.

16. The computer program product of claim 11, wherein instructions for determining a remedial action includes further instructions operable to cause a data processing apparatus to:
determine a classification for each of the one or more anomalies,
wherein a classification is associated with a remedial action;
sort the classifications using a predetermined prioritization scheme; and
retain a classification of the sorted classifications,
wherein the determined remedial action is associated with the retained classification.

17. The computer program product of claim 11, wherein remedial actions estimating parameters for the forecast model, applying the forecast model to the time series data to produce a plurality of outputs, or selecting a different forecast model.

18. The computer program product of claim 11, wherein identifying one or more anomalies includes analyzing the set of residual values using a tracking signal equation,
wherein the tracking signal equation uses a sum of the set of residual values and a mean absolute deviation value, and
wherein analyzing the set of residual values using the tracking signal equation includes determining a non-random condition in a control chart.

19. The computer program product of claim 18, wherein identifying one or more anomalies includes analyzing the set of residual values using the tracking signal equation further includes converting a product of the tracking signal equation using a standard deviation value.

20. The computer program product of claim 18, wherein identifying one or more anomalies includes determining that the tracking signal equation has produced an output that exceeds one or more error threshold values.

21. A computer-implemented method for applying forecast models and using outputs to implement remedial actions, comprising:
receiving time series data including a plurality of current data points;
receiving a forecast model for a forecast applicable to the time series data;
applying the forecast model to the time series data to produce a plurality of outputs;
generating, using an anomaly detection engine, a set of residual values using the plurality of current data points and the plurality of outputs, wherein a residual value indicates a difference between a current data point of the plurality of data points and an output of the plurality of outputs;
determining a set of control limits using a control chart and the set of residual values;
identifying, using the anomaly detection engine, one or more anomalies of the set of residual values, wherein anomalies are identified using the set of control limits and the control chart;
determining, using a remedial-action engine, a remedial action list including a plurality of types of remedial actions;
assigning, using the remedial-action engine, a prioritization to the types of remedial actions in the remedial action list, wherein prioritizations are based on computational costs of the remedial actions;
determining, using the remedial-action engine, a remedial action for the forecast model based on the prioritizations of the types of remedial actions in the remedial action list and the one or more anomalies; and
performing, using the remedial-action engine, the remedial action related to the forecast model.

22. The computer-implemented method of claim 21, wherein an anomaly indicates that a residual value of the set of residual values occurs outside the set of control limits.

23. The computer-implemented method of claim 21, wherein an anomaly indicates that a subset of sequentially residual values incrementally increase.

24. The computer-implemented method of claim 21, wherein identifying one or more anomalies includes determining a vintage date,
wherein a vintage date indicates a date at which the forecast model was selected or modified, and
wherein the one or more anomalies are identified for dates occurring on or after the vintage date.

25. The computer-implemented method of claim 21, wherein identifying one or more anomalies includes analyzing the set of residual values using a set of rules, and
wherein analyzing the set of residual values using the set of rules includes determining a non-random condition in a control chart.

26. The computer-implemented method of claim 21, wherein determining a remedial action further comprises:
determining a classification for each of the one or more anomalies,
wherein a classification is associated with a remedial action;
sorting the classifications using a predetermined prioritization scheme; and
retaining a classification of the sorted classifications,
wherein the determined remedial action is associated with the retained classification.

27. The computer-implemented method of claim 21, wherein remedial actions include estimating parameters for the forecast model, applying the forecast model to the time series data to produce a plurality of outputs, or selecting a different forecast model.

28. The computer-implemented method of claim 21, wherein identifying one or more anomalies includes analyzing the set of residual values using a tracking signal equation, wherein the tracking signal equation uses a sum of the set of residual values and a mean absolute deviation value, and wherein analyzing the set of residual values using the tracking signal equation includes determining a non-random condition in a control chart.

29. The computer-implemented method of claim 28, wherein identifying one or more anomalies includes analyzing the set of residual values using the tracking signal equation further includes converting a product of the tracking signal equation using a standard deviation value.

30. The computer-implemented method of claim 28, wherein identifying one or more anomalies includes determining that the tracking signal equation has produced an output that exceeds one or more error threshold values.

* * * * *